US011663564B1

(12) United States Patent
Maeng

(10) Patent No.: US 11,663,564 B1
(45) Date of Patent: May 30, 2023

(54) CREATING AND MANAGING PRIVATE ELECTRONIC CURRENCY

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 263 days.

(21) Appl. No.: 16/944,517

(22) Filed: Jul. 31, 2020

Related U.S. Application Data

(62) Division of application No. 15/669,486, filed on Aug. 4, 2017, now Pat. No. 10,762,478.

(51) Int. Cl.
| | | |
|---|---|---|
| *G06Q 40/02* | (2023.01) | |
| *G06Q 20/06* | (2012.01) | |
| *G06Q 40/00* | (2023.01) | |
| *G06Q 20/36* | (2012.01) | |
| *G06Q 20/10* | (2012.01) | |

(52) U.S. Cl.
CPC ......... *G06Q 20/0658* (2013.01); *G06Q 20/10* (2013.01); *G06Q 20/36* (2013.01); *G06Q 40/00* (2013.01)

(58) Field of Classification Search
CPC .... G06Q 20/0658; G06Q 20/10; G06Q 20/36; G06Q 40/00
See application file for complete search history.

(56) References Cited

U.S. PATENT DOCUMENTS

| | | |
|---|---|---|
| 6,339,765 B1 | 1/2002 | Maher |
| 7,590,602 B1 | 9/2009 | Luzzatto |
| 7,742,987 B2 | 6/2010 | Tso |

(Continued)

FOREIGN PATENT DOCUMENTS

| | | | |
|---|---|---|---|
| AU | 2017100426 A4 | * | 6/2017 |
| CN | 103729794 A | | 4/2014 |

OTHER PUBLICATIONS

Terri Bradford, Where Social Networks, Payments and Banking Intersect, Dec. 2012, Federal Reserve Bank of Kansas City, web, 2-5 (Year: 2012).*

(Continued)

*Primary Examiner* — I Jung Liu
(74) *Attorney, Agent, or Firm* — Schwegman Lundberg & Woessner, P.A.

(57) ABSTRACT

Methods and systems are disclosed for transactions with a private digital currency. The private e-currency may be backed by a financial institution, managed using a blockchain, and only available for transactions with members of a network associated with the financial institution. The members may include mobile wallets, merchants and ATM's. A mobile wallet may register with the network and receive an amount of the private e-currency from the financial institution. The mobile wallet may establish a connection with a payment recipient such as another wallet, an ATM or a merchant, and receive a payee address. The mobile wallet may send a transaction request to the blockchain for payment to the payee address of a payment amount of the private e-currency, so that the payment recipient can, using a blockchain, confirm or deny the transaction request.

21 Claims, 8 Drawing Sheets

(56) References Cited

U.S. PATENT DOCUMENTS

| | | | | |
|---|---|---|---|---|
| 8,510,220 | B2* | 8/2013 | Rackley, III | G06Q 20/102 |
| | | | | 705/40 |
| 8,712,918 | B2 | 4/2014 | Luzzatto | |
| 9,147,188 | B2 | 9/2015 | Dharmapalan | |
| 2007/0073585 | A1 | 3/2007 | Apple et al. | |
| 2008/0208725 | A1 | 8/2008 | Hoy et al. | |
| 2010/0145861 | A1 | 6/2010 | Law et al. | |
| 2012/0072350 | A1* | 3/2012 | Goldthwaite | G06Q 20/02 |
| | | | | 705/44 |
| 2014/0143142 | A1 | 5/2014 | Talker | |
| 2016/0239908 | A1* | 8/2016 | Dolen | G06Q 30/0611 |
| 2017/0213287 | A1* | 7/2017 | Bruno | G06Q 40/04 |

OTHER PUBLICATIONS

U.S. Appl. No. 15/669,486, filed Aug. 4, 2017, Creating and Managing Private Electronic Currency.

"Apple Pay", [Online]. Retrieved from the Internet: <URL: http://www.apple.com/apple-pay/, (Accessed Mar. 31, 2016), 8 pgs.

"U.S. Appl. No. 15/669,486, Examiner Interview Summary dated Apr. 7, 2020", 3 pgs.

"U.S. Appl. No. 15/669,486, Final Office Action dated Feb. 6, 2020".

"U.S. Appl. No. 15/669,486, Notice of Allowance dated Apr. 28, 2020".

"U.S. Appl. No. 15/669,486, Response filed Jan. 27, 2020 to Restriction Requirement dated Nov. 25, 2019", 8 pgs.

"Application U.S. Appl. No. 15/669,486, Response filed Apr. 6, 2020 to Final Office Action dated Feb. 6, 2020".

"U.S. Appl. No. 15/669,486, Restriction Requirement dated Nov. 25, 2019", 6 pgs.

"How EMV (Chip & PIN) Works—Transaction Flow Chart", EMV Level 2 Kernels, [Online]. [Accessed Feb. 28, 2019]. Retrieved from the Internet: <URL: https://www.level2kernel.com/flow-chart.html>, 3 pgs.

"Why 6 confirmations'?", Bitcoin, [Online]. [Accessed May 23, 2017]. Retrieved from the Internet: <URL: https://www.reddit.com/r/Bitcoin/comments/1cqyb1/why_6_confirmations/ >, 4 pgs.

Bradford, Terri, "Where Social Networks, Payment and Banking Intersect", Federal Reserve Bank of Kansas City, (Dec. 2012), 1-7.

Dove, Jackie, "Mobile Wallets: Apple Pay vs Samsung Pay vs Google Pay", Tom's Guide Updated Jan. 17, 2018, [Online]. [Accessed Feb. 28, 2019]. Retrieved from the Internet: <URL: https://www.tomsguide.com/us/mobile-wallet-guide,news-20666.html>, 8 pgs.

Egan, Matt, "What is NFC? Uses of NFC | How to use NFC on your smartphone", Tech Advisor, [Online]. [Accessed Feb. 28, 2019]. Retrieved from the Internet: <URL: https://www.techadvisor.co.uk/how-to/mobile-phone/what-is-nfc-how-nfc-works-what-it-does-3472879/>, (May 12, 2015), 5 pgs.

Geuss, Megan, "How Apple Pay and Google Wallet actually work", [Online]. Retrieved from the Internet: <URL: http://arstechnica.com/gadgets/2014/10/how-mobile-payments-really-work/1/, (Oct. 29, 2014), 5 pgs.

Geuss, Megan, "Why Apple Pay could succeed where others have had underwhelming results", [Online]. Retrieved from the Internet: <URL: http://arstechnica.com/apple/2014/09/why-apple-pay-could-succeed-where-others-have-had-underwhelming-results/, (Sep. 14, 2014), 6 pgs.

Kar, Ian, "Here's How the Security Behind Apple Pay Will Really Work", [Online]. Retrieved from the Internet: <URL: http://bankinnovation.net/2014/09/heres-how-the-security-behind-apple-pay-will-really-work/, (Sep. 12, 2014), 5 pgs.

* cited by examiner

CREATING AND MANAGING PRIVATE ELECTRONIC CURRENCY

This application is a divisional of U.S. patent application Ser. No. 15/669,486, filed Aug. 4, 2017, which is incorporated herein by reference in its entirety.

TECHNICAL FIELD

Embodiments described herein generally relate to mobile or digital wallets including systems and methods for creating and managing private digital currency for use with a mobile wallet.

BACKGROUND

Mobile wallet applications may be used to make payments. For example, a consumer may execute a mobile wallet application on a user computing device and use the mobile wallet application to provide payments to merchants for goods and services. Payments are made in digital currency associated with government-issued assets.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
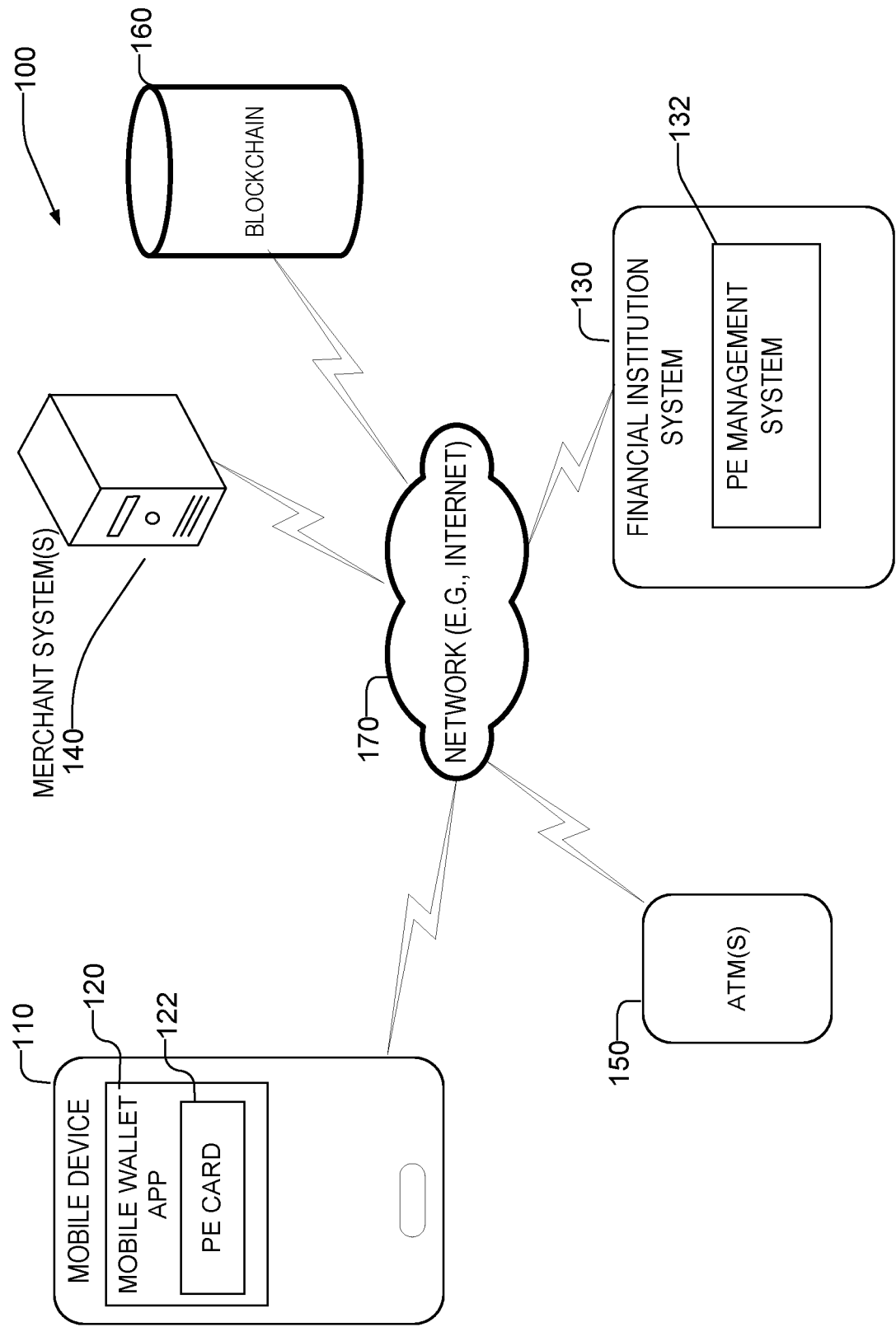
FIG. 1 is a diagram showing one example of an environment for a mobile wallet application.

A mobile wallet (also known as an electronic or digital wallet) refers to an application program executed by one or more computing devices (e.g., mobile devices such as a smartphone) and corresponding device memory which store and manage digital representations of elements (or items) typically found in a user's wallet or purse. These elements (also referred to as cards) may comprise payment elements and non-payment elements. Payment elements are items which may be used in a financial transaction. Example payment elements managed by the digital wallet include digital representations of transaction cards, financial information, checking accounts, discount coupons, gift cards, subway passes, movie tickets, and so on. Example non-payment elements include digital representations of driver's licenses, passports, student ids, library cards, membership cards, insurance cards, and so on.

A mobile wallet application may allow an individual to use the stored information to pay for items (either in person or in e-commerce transactions), provide for identification (e.g., producing a driver's license), transfer money to others, access bank accounts, collect discount coupons, submit subway passes, and the like. Exemplary mobile wallets include but are not limited to WELLS FARGO WALLET™, CITI PAY™, STARBUCKS® APP, WALMART PAY™, APPLE PAY™, ANDROID PAY™, GOOGLE WALLET™, SAMSUNG PAY™, GYFT APP™, and peer-to-peer payment apps such as VENMO®, SQUARE CASH™, and TILT APP™.

A payment element or card is typically used to make payments in a government-backed currency and may be linked to a user's credit card account or checking account for example. In some cases, a payment is made in a foreign government-backed currency and a financial institution associated with the payment card, debits a user's local government-backed currency. In other cases, a user may use a paper form of the government-backed currency to make a payment. Governments often use sophisticated and expensive printing techniques to avoid counterfeiting. This increases the cost of government-backed currency.

The disclosure herein provides methods and systems for using private e-currency for payments between mobile wallets and payment recipients. A private e-currency refers to a digital currency backed by a financial institution and only available for transactions with members of a network associated with the financial institution. Transactions with the private, digital e-currency may be maintained in blockchain which may enhance the security of the currency and prevent fraud. The financial institution may also guarantee the conversion of the private e-currency into one or more government-backed currencies, allowing users to convert private e-currency to government-backed currency at an automated transaction machine (ATM), for example. The use of a private e-currency by the financial institution may serve to enhance customer loyalty and brand awareness. These are among other features of the examples provided herein.

FIG. 1 illustrates an example environment 100 for managing and using a private e-currency. The example environment 100 includes a mobile wallet application 120 (sometimes, simply referred to as a mobile wallet) operating on a mobile device 110 such as a smart phone or smart watch. The mobile wallet application 120 includes one or more elements such as payment elements (e.g., credit or debit cards) and non-payment elements (e.g., identification cards). One of the elements may be a private e-currency (PE) card 122 for transacting using the private e-currency. The mobile device 110 may also include other components such as, among other things, a network interface for communicating over a network 170 and a global positioning system (GPS) for acquiring location data for the mobile device 110.

The environment 100 further includes a financial institution system 130 which manages and financially backs the private e-currency. The financial institution system 130 may comprise one or more computing systems affiliated with a financial institution such as a bank. The financial institution may be registered with a government and may hold government-backed assets including government-backed currency. The financial institution system 130 may include a private e-currency management system (PE management system) 132 which may register PE cards on mobile wallets with a network associated with the financial institution and may issue private e-currency to the PE cards, for example.

The environment 100 also includes one or more merchant systems 140 which may be registered members of the financial institution's private e-currency network. The merchant systems 140 may include one or more computing systems capable of receiving transaction requests from mobile wallets including transaction requests from the PE card 122 using the private e-currency and recording the private e-currency transactions in a blockchain.

The example environment 100 further includes an ATM 150 which may be a registered member of the financial institution's private e-currency network. The ATM 150 may, for example, receive and record transaction requests from the PE card 122. The ATM 150 may communicate with a PE card 122 using NFC for example. The ATM 150 may, for example, receive a transaction request from the PE card 122 for an amount of a private e-currency and may dispense paper government-backed currency in a corresponding amount. In some cases, the private e-currency may be fixed to a particular government-backed currency. In other cases, the ATM 150 may determine the corresponding amount by checking with the financial institution system 130. The financial institution system 130 may maintain multiple exchange rates for the private e-currency allowing the private e-currency to be redeemed for multiple, different government-issued paper currency depending on the geography of the wallet.

The environment 100 further includes a blockchain 160. The blockchain 160 may be a data structure storing transactions in the private e-currency. It may operate across multiple computers and may be a public or private blockchain. A public blockchain may allow anyone to read and/or write to the blockchain. A private blockchain may require users to obtain permission to read and/or write to the blockchain. In one example, the blockchain 160 is a private blockchain with read and write access limited to members of the financial institution's network and miners (not shown) which may or may not be part of the network.

The financial institution 130, mobile wallet 120/PE card 122, merchant system(s) 140 and ATM(s) 150 may use the blockchain 160 to record transactions between them (e.g., payments using private e-currency, issuing of private e-currency) and query the blockchain for private e-currency balances, for example. The environment 100 also may also include miners (not shown) that confirm or validate transaction requests and add validated transactions as a new block to the blockchain 160. In a public blockchain, after a certain number of confirmations (e.g., six), a new block may be added to the blockchain for the transaction request. In a private blockchain, miners may be trusted and a new block may be added with the first confirmation, for example.

The environment 100 further includes one or more networks such as the network 170 over which the various systems communicate using network interfaces. The network 170 can include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network 170 can include a single local area network (LAN) or wide-area network (WAN), or combinations of LAN's or WAN's, such as the Internet.

Figure 2:
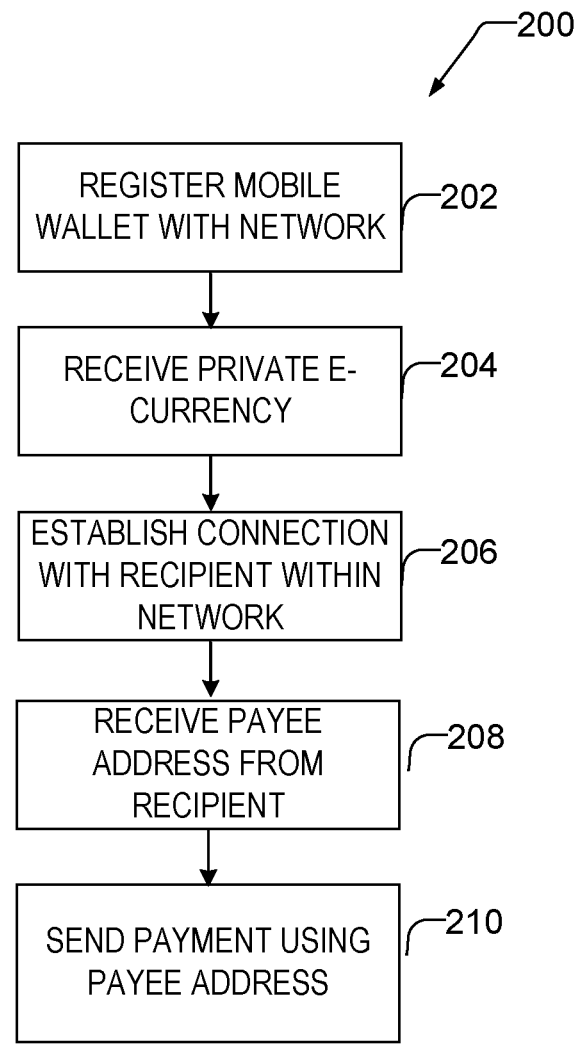
FIG. 2 is a flowchart showing one example of a process flow that may be executed by a mobile wallet application.

FIG. 2 is a flowchart showing an example of a process flow 200 that may be executed by a mobile wallet for transacting with a payment recipient using a private e-currency. The process flow 200 is described with regard to a mobile wallet. The mobile wallet may be solely designated for managing the private e-currency or may include multiple wallet elements including a payment element or card within the mobile wallet for managing the private e-currency. The private e-currency may be a digital currency guaranteed by a financial institution to be convertible into a government-backed currency and only available for transactions with members of a network associated with a financial institution. Members can be any individual or organization which are qualified to participate in the private e-currency service. Private e-currency may be used among members, and in some cases, non-members may accept private e-currency but may not be able to use the full service. The mobile wallet may be executing on one or more computing devices.

At 202, the mobile wallet may register with a network associated with a financial institution. This may include providing an identifier associated with the mobile wallet (e.g., a wallet id or a device id) to a financial institution system (FI system) and receiving a registration number or identification for the mobile wallet from the FI system. The network may include multiple members (e.g., the mobile wallet, one or more payment recipients including merchants and ATMS, etc.) registered with the financial institution for conducting transactions with the private e-currency. As part of registration, the mobile wallet may receive a private key for signing transaction requests using the private e-currency.

At 204, the mobile wallet may receive a private e-currency (PE) amount (e.g., an initial or subsequent deposit) from the FI system. This may include receiving a user input of the PE amount and a selection of a financial account for paying for the PE amount. The financial account may, for example, be a checking account or a credit card account. The requested PE amount and payment credentials for the financial account may be sent to the FI system, which may in turn issue the PE amount, debit the user's financial account, and record the transaction in a blockchain. The mobile wallet may further receive a PE address for the PE amount (e.g., for an initial deposit) or may provide a PE address to the FI system for depositing the requested PE amount at the address (e.g., for subsequent deposits). The PE address and private key of the wallet may be used to conduct transactions with members of the network. The mobile wallet may display a balance of the private e-currency available to the wallet.

At 206, the mobile wallet may establish communication with a payment recipient. Communication may be established in a variety of manners including using a network (e.g., network 170) or near-field communication (NFC) as examples. With an online merchant, the mobile wallet may communicate using the internet. With a brick-and-mortar merchant, the mobile wallet may communicate with a POS device associated with the merchant using NFC for example. NFC may be used for communicating with an ATM as well.

At 208, the mobile wallet may receive a payee address for the payment recipient (e.g., merchant). For example, the merchant may send transaction details including the payee address and the amount of the purchase (e.g., goods or services) to the mobile wallet. The may be done over the established communication path.

At 210, the mobile wallet may send a payment to the payment recipient using the payee address. This may include the mobile wallet sending a transaction request to the blockchain that includes an amount of private e-currency (PE amount), the payee address and one or more PE address (es) of the mobile wallet for paying the PE amount. The transaction request may be sent to one or more computers responsible for confirming transactions and/or adding transaction blocks to the blockchain. The payment recipient can, using the blockchain, confirm that the PE amount is stable prior to confirming the transaction with the mobile wallet.

The mobile wallet may receive a confirmation or a denial of the transaction from the payment recipient. This may be received over the established communication path or a new communication path. The mobile wallet may update a balance of the private e-currency stored in the wallet based on the confirmation of the transaction. Periodically, the mobile wallet may query the blockchain to verify the amount of private e-currency it stores matches the blockchain record, and may report any deviation to the financial institution system.

The mobile wallet may display an amount of one or more government-backed currencies corresponding to the available amount of private e-currency. In some examples, the mobile wallet may determine its location and selectively display a government-backed currency associated with the location and corresponding to the available amount of private e-currency. The mobile wallet may, for example, determine its location using a GPS system on its computing device. The mobile wallet may hold a number of different private e-currencies, each associated with its own address and private key. The different private e-currencies may be of a different type (e.g., corresponding to different government-backed currencies) or of the same type (e.g., corresponding to the same government-backed currency). The mobile wallet may also hold a universal-type private e-currency that may be converted (and guaranteed by the financial institution) into any of multiple government-backed securities.

As noted earlier, one or more automated transaction machines (ATM's) may be members of the financial institution's network. Where the payment recipient is an ATM, the mobile wallet may receive, from the ATM, government-backed paper currency in an equivalent amount to the payment amount of the private e-currency. In some cases, the payment amount may exceed a purchase price of a product (good or service) by a difference. In such as case, the mobile wallet may receive a notification from the payment recipient that it issued private e-currency in the amount of the difference to the mobile wallet. To receive the difference, the mobile wallet may provide an address for the difference to the wallet (e.g., along with or subsequent to the transaction request for the payment amount. The mobile wallet may also send a request to the payment recipient to issue government-backed paper currency in the amount of the difference.

Figure 3:
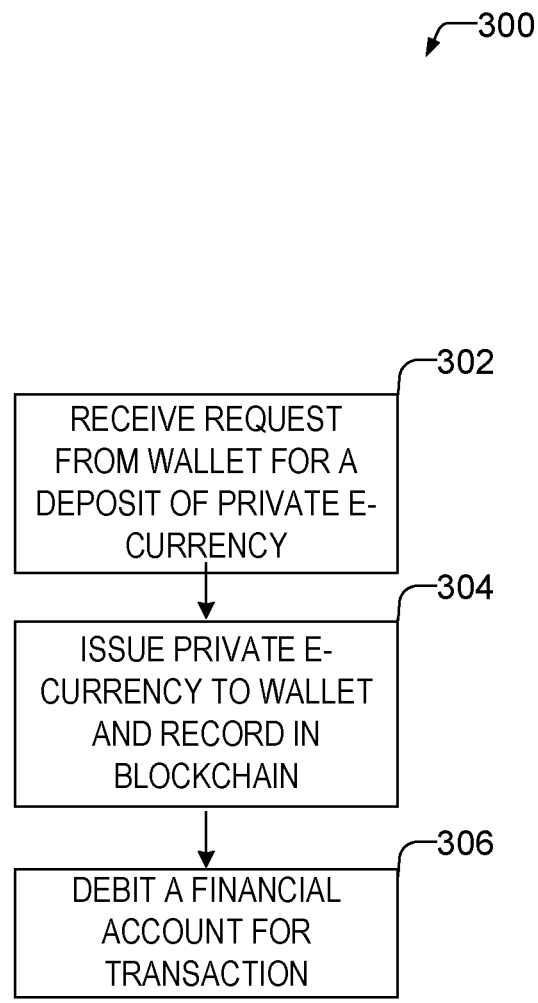
FIG. 3 is a flowchart showing one example of a process flow that may be executed by a financial institution system.

FIG. 3 is a flowchart showing an example of a process flow 300 that may be executed by a financial institution system for managing private e-currency for a mobile wallet. The FI system may execute on one or more computing devices and may be associated with a financial institution (e.g., part of the FI's computing systems or operated by an affiliate such as a wallet service provider or card processing network).

At 302, the FI system may receive from a mobile wallet (e.g., a mobile wallet or card within a mobile wallet) a request for depositing an amount of the private e-currency. The FI system may register the mobile wallet as part of its network, as discussed above. The private e-currency may be a digital currency that is managed using a blockchain, guaranteed by the financial institution to be convertible into a government-backed currency and only available for transactions with members of the network. The financial institution may hold government-backed currency assets in reserves in an amount dependent upon the total amount of private e-currency issued by the financial institution. The deposit request may include payment credentials for a financial account to debit for paying for the private e-currency.

At 304, the FI system may issue the amount of the private e-currency and record the issuing of the amount in a blockchain. The FI system may record the issuance by recording the amount of the private e-currency and an address associated with the private e-currency in the blockchain. At 306, the FI system may debit a financial account an amount of government-backed currency corresponding to the amount of private e-currency issued to the wallet. This may include receiving from the mobile wallet information related to the financial account, such as payment credentials or account number and PIN. The financial account may be any type of account from which payments may be made, including for example a checking account or credit card account held by the user at the financial institution or another financial institution.

The financial institution may maintain a certain level of government-backed currency assets as collateral for the private e-currency. The FI system may record the level of assets in the blockchain and the total amount of private e-currency held by all members of the network (e.g., mobile wallets, payment recipients, merchants, ATMs). Payment recipients may request (e.g., from the financial institution or a trusted third party) the current level of assets and total amount of private e-currency before accepting a payment request from a mobile wallet if desired. In some examples, the FI system may periodically send, using the one or more computing systems associated with the financial institution, to the blockchain a request for the current amount of private e-currency held by a mobile wallet.

Figure 4:
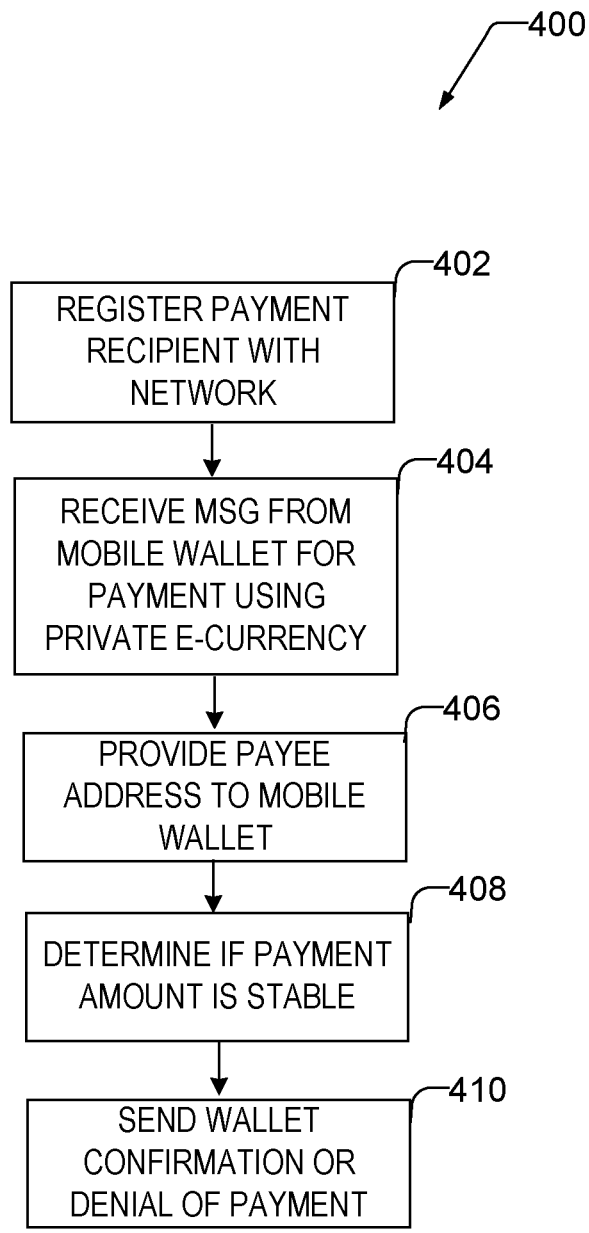
FIG. 4 is a flowchart showing one example of a process flow that may be executed by a payment recipient system.

FIG. 4 is a flowchart showing an example of a process flow 400 that may be executed by a payment recipient system (e.g., a merchant system, ATM or another mobile wallet) for receiving a payment from a mobile wallet. The payment recipient system may operate on one or more computing devices. At 402, the payment recipient system may register with a network associated with a financial institution. This may include providing an identifier (e.g., a network id or a device id) to a financial institution system (FI system) and receiving a registration number or identification from the FI system. The network may include multiple members (e.g., mobile wallets, payment recipients including merchants and ATMS, etc.) registered with the financial institution for conducting transactions with the private e-currency. The payment recipient system may also receive a private key from the financial institution system and may use the key to sign transaction requests for payments to other members of the network.

At 404, the payment recipient system may receive message from a mobile wallet to make a payment in private e-currency. The message may include a payment amount of the private e-currency and a payor (e.g., wallet's) address associated with a private e-currency. Prior to receiving the transaction request, the payment recipient system and mobile wallet may establish a connection (e.g., using a network or NFC). The systems may also exchange network registration identification so each can determine if the other is a registered member of the network. The payment recipient system may determine network membership of the wallet in a variety of ways. It may receive a registration number from the mobile wallet and query the FI system to determine if the mobile wallet is a member. In other examples, a list of network members may be maintained by the FI system and pushed to the network members for locally querying.

At 406, the payment recipient system may provide the mobile wallet with a payee (recipient) address for the payment amount. This may be done over the established communication channel with the mobile wallet. The mobile wallet may send a transaction request for the payment amount to the payee address, as discussed above. The mobile wallet may also send to the payment recipient system a message indicating that a transaction request for the payment amount has been or is being sent to the blockchain for confirmation.

At 408, the payment recipient system may determine that the payment amount is stable using the blockchain. This may be performed after the payment recipient system receives a message from the mobile wallet indicating a transaction request was sent. The may include searching the blockchain for confirmation(s) of the transaction request using the payor address and/or the payee address as search query terms. The determination of whether a payment amount is stable may be performed using, for example, rules established by the payment recipient system. For example, the payment recipient system may have rules that require a certain (e.g., pre-defined) number of confirmations of a transaction request in the blockchain (e.g., one confirmation in a private blockchain or six confirmations in a pubic blockchain) before approving a transaction request from a mobile wallet. The payment recipient system may send the transaction request to the blockchain and wait for the required number of confirmations before confirming the transaction request. At 410, the payment recipient system may send a confirmation or denial of the transaction request to the mobile wallet.

Where the payment recipient system is an automated transaction machine (ATM), the ATM may dispense government-backed paper currency in an equivalent amount to the payment amount of the private e-currency after, e.g., receiving a pre-defined number of confirmations. With a merchant, when the payment amount exceeds a purchase price of a product (e.g., good or service) by a difference, the payment recipient system may send the difference in a separate payment to the mobile wallet. This may be done by the payment recipient system by recording a transaction request in the blockchain in the amount of the difference to an address associated with the mobile wallet. The address may have been provided by the mobile wallet during when sending the notice of the transaction request opt the payment recipient system.

Figure 5:
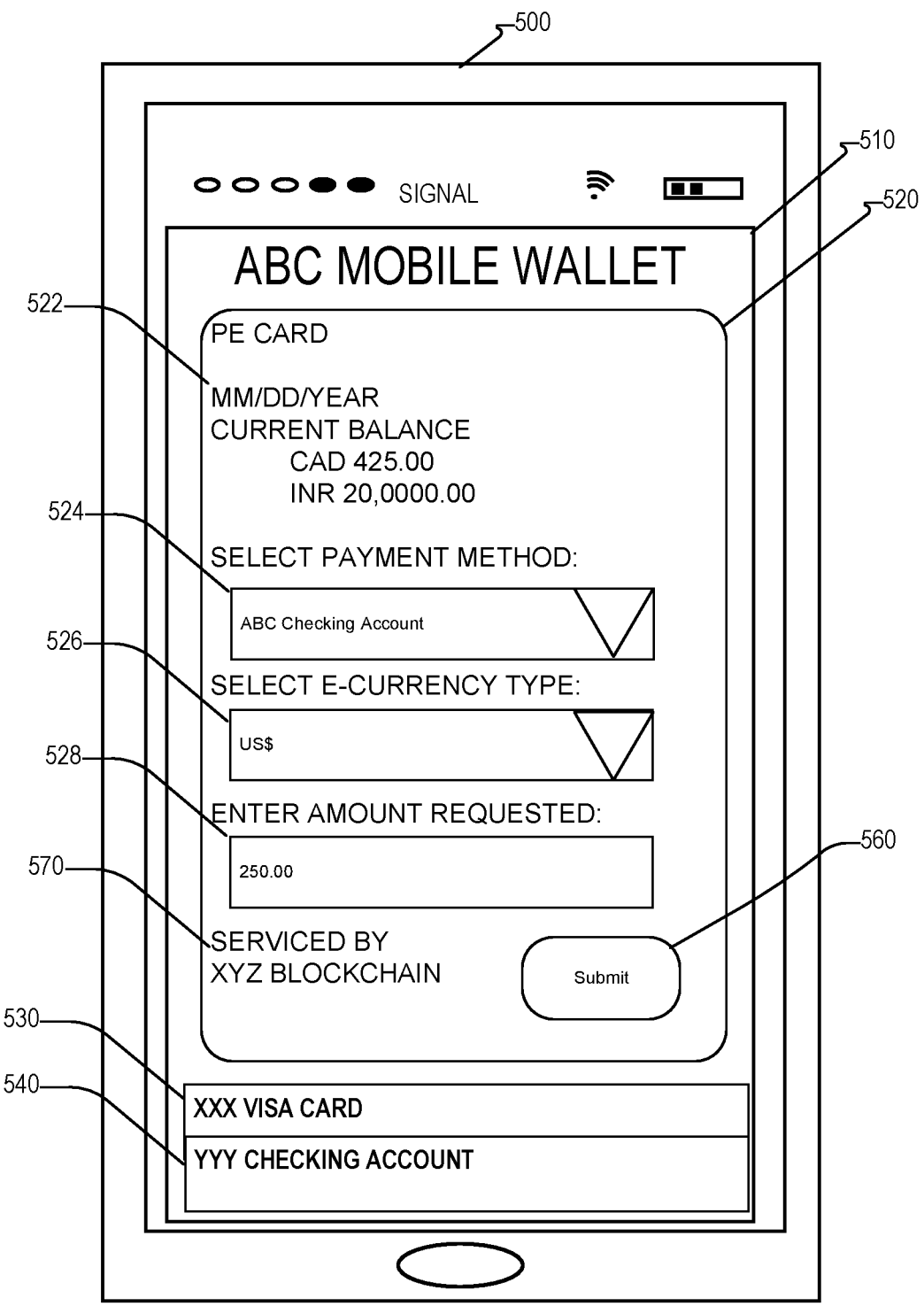
FIG. 5 illustrates an example mobile wallet operating on a mobile computing device.

FIG. 5 illustrates an example mobile wallet 510 operating on a mobile computing device 500. The mobile wallet 510 may include a private e-currency (PE) card 520 that is a member of a private e-currency network associated with a financial institution. The wallet 510 may also include other payment elements such as an XXX Visa card 530 and a YYY checking account 540. The PE card 520 may receive private e-currency from the financial institution as discussed above. The PE card 520 may display in a user interface the current balance(s) 522 of private e-currency associated with the card. In the example, the PE card 520 holds private e-currency corresponding to CAD 425 and private e-currency corresponding INR 20,000. The PE card 520 may have a private key (e.g., received from the financial institution) for signing transactions. Each private e-currency may be associated with an address so that private e-currency transactions may be signed with the PE card private key and recorded in a blockchain.

To receive additional private e-currency, the PE card 520 may include inputs 524, 526, 528 for receiving from a user a selection of a payment method (e.g., a financial account) for buying the e-currency, an e-currency type (e.g., an equivalent government-backed currency such as US$, for example), and a total amount of the selected government-backed currency to convert to private e-currency. The PE card 520 may also include an input button 560 for submitting the request to purchase private e-currency.

The mobile wallet may communicate with the financial institution and request a deposit of an amount of private e-currency corresponding to the specified government-backed currency. The financial institution may receive the request, issue the requested amount of the private e-currency and record the transaction in the blockchain. The financial institution may also reserve funds in the government-backed currency for use in guaranteeing the conversion of the private e-currency into the government-backed currency. The PE card may 520 also display the blockchain 570 in which the issued private e-currency is recorded. A user of the mobile wallet 510 may open the PE card 520, select a private e-currency and an amount to pay and tap the mobile device 500 to a POS device to make a payment.

Figure 6:
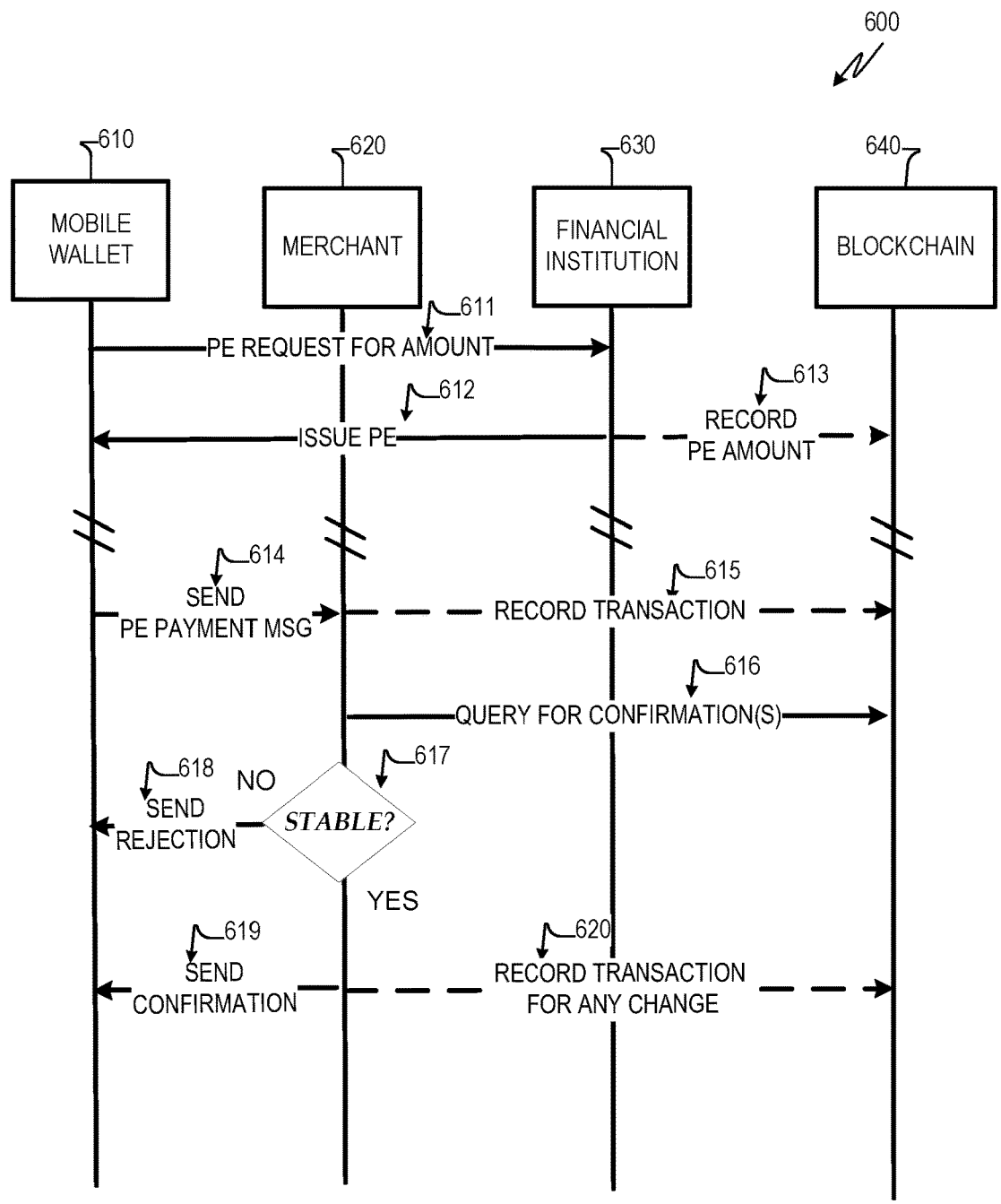
FIG. 6 is a timing diagram showing an example of processing private e-currency.

FIG. 6 is a timing diagram 600 showing an example of processing private e-currency. The example is illustrated with a mobile wallet 610, a payment recipient such as a merchant 620, a financial institution system 630 and a blockchain 640. At 611, the mobile wallet 610 may request an amount of private e-currency (PE) from the financial institution 630. The financial institution may issue the PE amount to the mobile wallet at 68 and record the transaction in the blockchain 640 at 613. As noted in the diagram, the issuing of the e-currency to the mobile wallet 610 and the recording of the issuance in the blockchain may be performed simultaneously or near simultaneously. Issuing the e-currency to the mobile wallet may include notifying the wallet of the recording of the transaction in blockchain. It may also include providing an address for the private e-currency. The recording in the blockchain may serve as proof that that mobile wallet owns the requested amount in private e-currency.

At 614, after being issued private e-currency, the mobile wallet 610 may submit an amount of private e-currency as a payment to a merchant 620. At 615, the mobile wallet 510 may record the transaction with the blockchain 640. As noted by the arrows, the payment at 614 and recording of the payment at 615 may be performed simultaneously or near simultaneously. At 616, the merchant system 320 may access the blockchain 640 and query the blockchain for confirmations of the transaction request (submitted at 615). At 617, the merchant system may verify whether the mobile wallet has stable private e-currency in the amount of payment. This may include comparing the number of confirmations of the transaction request in the blockchain with a threshold (e.g., a pre-defined number of necessary confirmations) and declaring the payment amount stable if the number confirmations meets or exceeds the threshold.

At 618, the merchant system 620 may send a rejection message to the mobile wallet 610 if the PE amount is not stable. If there is enough stable private e-currency, the merchant may send a confirmation of the transaction at 619. Where the payment amount exceeds the price of the product being purchased, the merchant system 620 may pay the difference to the mobile wallet 610 in e-currency. The difference may be paid by recording a transaction in the blockchain from a merchant PE address to a mobile wallet PE address.

Figure 7:
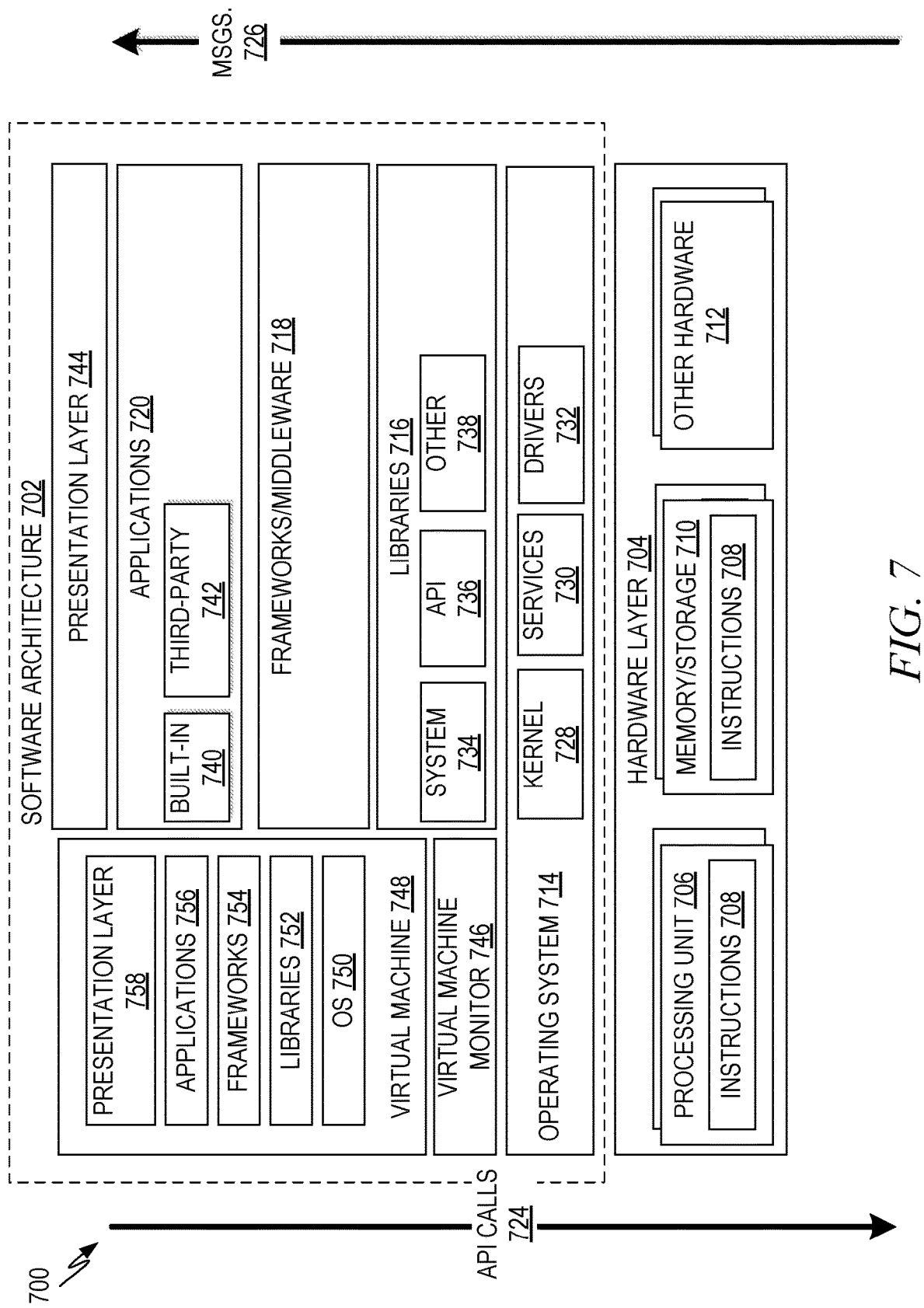
FIG. 7 is a block diagram showing one example of a software architecture for a computing device.

FIG. 7 is a block diagram 700 showing one example of a software architecture 702 for a computing device. The architecture 702 may be used in conjunction with various hardware architectures, for example, as described herein. FIG. 7 is merely a non-limiting example of a software architecture 702 and many other architectures may be implemented to facilitate the functionality described herein. A representative hardware layer 704 is illustrated and can represent, for example, any of the above referenced computing devices. In some examples, the hardware layer 704 may be implemented according to the architecture 800 of FIG. 8.

The representative hardware layer 704 comprises one or more processing units 706 having associated executable instructions 708. Executable instructions 708 represent the executable instructions of the software architecture 702, including implementation of the methods, modules, components, and so forth of FIGS. 1-8. Hardware layer 704 also includes memory and/or storage modules 710, which also have executable instructions 708. Hardware layer 704 may also comprise other hardware as indicated by other hardware 78, which represents any other hardware of the hardware layer 704, such as the other hardware illustrated as part of hardware architecture 800.

In the example architecture of FIG. 7, the software 702 may be conceptualized as a stack of layers where each layer provides particular functionality. For example, the software 702 may include layers such as an operating system 714, libraries 716, frameworks/middleware 718, applications 720, and presentation layer 744. Operationally, the applications 720 and/or other components within the layers may invoke application programming interface (API) calls 724 through the software stack and receive a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of a hardware or software interrupt and, in response, cause the architecture 702 to pause its current processing and execute an ISR when an interrupt is received. The ISR may generate the alert, for example, as described herein.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 and/or other software components/modules. For example, the frameworks 718 may provide various GUI functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other user computing device operating systems. In this example, the third-party application 742 may invoke the API calls 724 provided by the mobile operating system such as operating system 714 to facilitate functionality described herein.

The applications 720 may utilize built-in operating system functions (e.g., kernel 728, services 730 and/or drivers 732), libraries (e.g., system 734, APIs 736, and other libraries 738), frameworks/middleware 718 to create user interfaces to interact with users of the system. Alternatively, or additionally, in some systems, interactions with a user may occur through a presentation layer, such as presentation layer 744. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 7, this is illustrated by virtual machine 748. A virtual machine creates a software environment where applications/modules can execute as if they were executing on a hardware computing device. A virtual machine is hosted by a host operating system (operating system 714) and typically, although not always, has a virtual machine monitor 746, which manages the operation of the virtual machine 748 as well as the interface with the host operating system (i.e., operating system 714). A software architecture executes within the virtual machine 748 such as an operating system 750, libraries 752, frameworks/middleware 754, applications 756, and/or presentation layer 758. These layers of software architecture executing within the virtual machine 748 can be the same as corresponding layers previously described or may be different.

Figure 8:
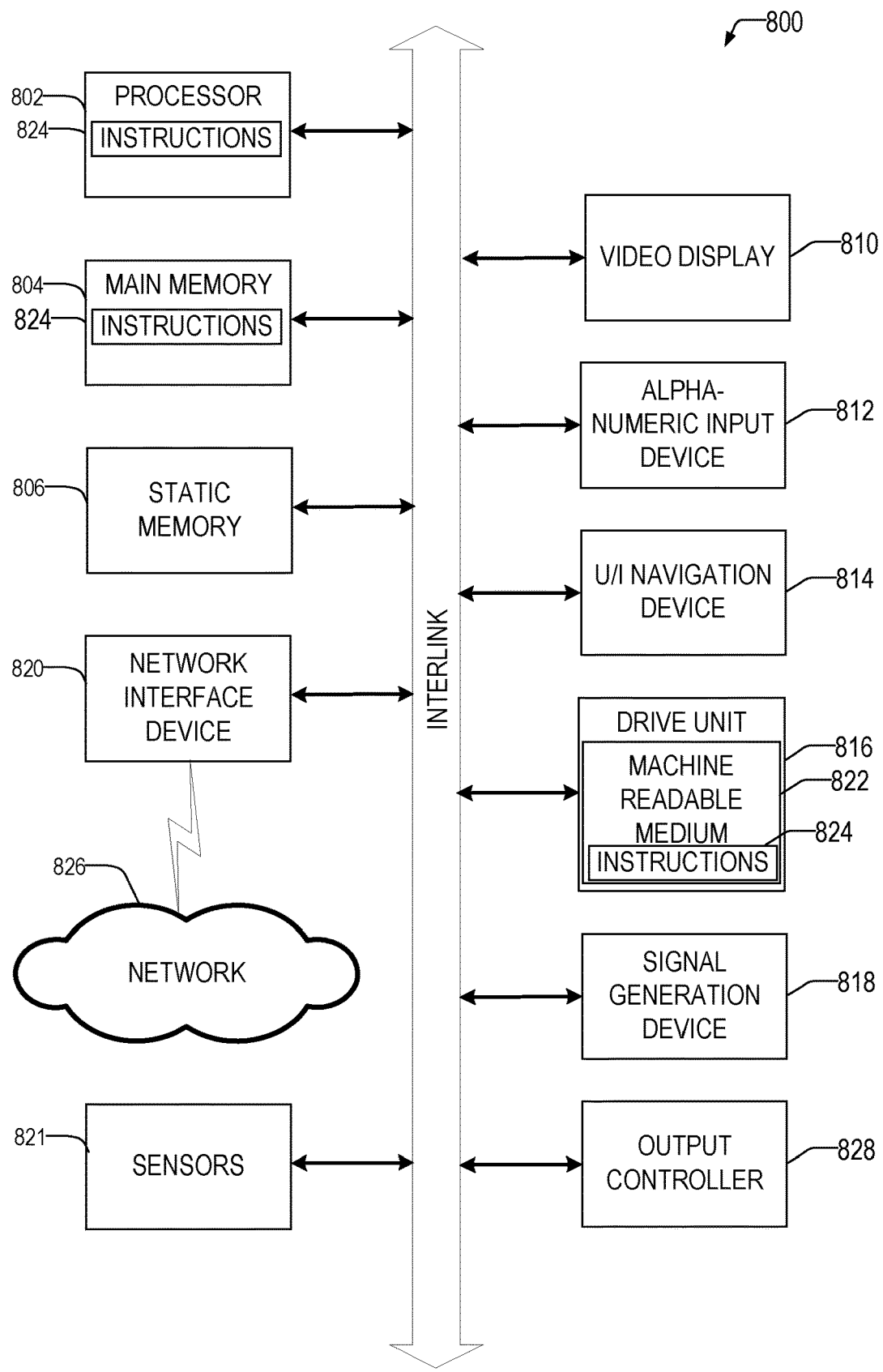
FIG. 8 is a block diagram illustrating a computing device hardware architecture, within which a set or sequence of instructions can be executed to cause the machine to perform examples of any one of the methodologies discussed herein.

FIG. 8 is a block diagram illustrating a computing device hardware architecture 800, within which a set or sequence of instructions can be executed to cause the machine to perform examples of any one of the methodologies discussed herein. For example, the architecture 800 may execute the software architecture 702 described with respect to FIG. 7. The architecture 800 may operate as a standalone device or may be connected (e.g., networked) to other machines. In a networked deployment, the architecture 800 may operate in the capacity of either a server or a client machine in server-client network environments, or it may act as a peer machine in peer-to-peer (or distributed) network environments. The architecture 800 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify operations to be taken by that machine.

Example architecture 800 includes a processor unit 802 comprising at least one processor (e.g., a central processing unit (CPU), a graphics processing unit (GPU) or both, processor cores, compute nodes, etc.). The architecture 800 may further comprise a main memory 804 and a static memory 806, which communicate with each other via a link 808 (e.g., bus). The architecture 800 can further include a video display unit 810, an alphanumeric input device 812 (e.g., a keyboard), and a UI navigation device 814 (e.g., a mouse). In some examples, the video display unit 810, input device 812, and UI navigation device 814 are incorporated into a touch screen display. The architecture 800 may additionally include a storage device 816 (e.g., a drive unit), a signal generation device 818 (e.g., a speaker), a network interface device 820, and one or more sensors (not shown), such as a GPS sensor, compass, accelerometer, or other sensor.

In some examples, the processor unit 802 or other suitable hardware component may support a hardware interrupt. In response to a hardware interrupt, the processor unit 802 may pause its processing and execute an ISR, for example, as described herein.

The storage device 816 includes a machine-readable medium 822 on which is stored one or more sets of data structures and instructions 824 (e.g., software) embodying or utilized by any one or more of the methodologies or functions described herein. The instructions 824 can also reside, completely or at least partially, within the main memory 804, static memory 806, and/or within the processor unit 802 during execution thereof by the architecture 800, with the main memory 804, static memory 806, and the processor unit 802 also constituting machine-readable media. Instructions stored at the machine-readable medium 822 may include, for example, instructions for implementing the software architecture 1302, instructions for executing any of the features described herein, etc.

While the machine-readable medium 822 is illustrated in an example to be a single medium, the term "machine-readable medium" can include a single medium or multiple media (e.g., a centralized or distributed database, and/or associated caches and servers) that store the one or more instructions 824. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 can further be transmitted or received over a communications network 826 using a transmission medium via the network interface device 820 utilizing any one of a number of well-known transfer protocols (e.g., HTTP). Examples of communication networks include a LAN, a WAN, the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for managing a private e-currency for a mobile wallet, using one or more computing devices associated with a financial institution, comprising:
   receiving, from the mobile wallet, a request for depositing an amount of the private e-currency, the private e-currency being a digital currency that is managed using a blockchain, guaranteed by the financial institution to be convertible into a government-backed currency and only available for transactions with members of a network, the financial institution holding government-backed currency assets;
   reserving funds in the government-backed currency in order to guarantee that the private e-currency is convertible in the government-backed currency;
   issuing, to the mobile wallet, the amount of the private e-currency and recording the issuing of the amount in a blockchain, wherein recording the amount includes recording the amount and an address associated the private e-currency;
   debiting a financial account of a user an amount of government-backed currency corresponding to the amount of private e-currency issued to the mobile wallet;
   querying, by the mobile wallet, the blockchain to verify the amount of the private e-currency stored at the mobile wallet matches a record at the blockchain;
   determining if a deviation exists between the amount of the private e-currency stored at the mobile wallet and the record at the blockchain; and
   if the deviation exists, reporting, by the mobile wallet, the deviation to the financial institution.

2. The method of claim 1, further including periodically sending, using the one or more computing devices associated with the financial institution, to the blockchain a request for a current amount of private e-currency held by the mobile wallet.

3. The method of claim 2, further including registering, using the one or more computing devices associated with the financial institution, the mobile wallet and a payment recipient system in the network.

4. The method of claim 1, wherein debiting the financial account of the user further includes receiving from the mobile wallet information related to the financial account.

5. The method of claim 4, wherein the information related to the financial account includes one of payment credentials or account number and a personal identification number (PIN).

6. The method of claim 5, further including receiving from a payment recipient system in the network a request for a current level of assets and a total amount of private equity of the mobile wallet.

7. The method of claim 1, further including recording a level of assets in the blockchain and a total amount of private e-currency held by the members of the network.

8. A system for managing a private e-currency for a mobile wallet operating on a computing device, the system comprising:
   at least one processor; and
   at least one storage device comprising instructions, which when executed by the at least one processor, configure the at least one processor to perform operations comprising:
      receiving, from the mobile wallet, a request for depositing an amount of the private e-currency, the private e-currency being a digital currency that is managed using a blockchain, guaranteed by a financial institution to be convertible into a government-backed currency and only available for transactions with members of a network, the financial institution holding government-backed currency assets;
      reserving funds in the government-backed currency in order to guarantee that the private e-currency is convertible in the government-backed currency;
      issuing, to the mobile wallet, the amount of the private e-currency and recording the issuing of the amount in a blockchain, wherein recording the amount includes recording the amount and an address associated the private e-currency;
      debiting a financial account of a user an amount of government-backed currency corresponding to the amount of private e-currency issued to the mobile wallet;
      querying, by the mobile wallet, the blockchain to verify the amount of the private e-currency stored at the mobile wallet matches a record at the blockchain;
      determining if a deviation exists between the amount of the private e-currency stored at the mobile wallet and the record at the blockchain; and
      if the deviation exists, reporting, by the mobile wallet, the deviation to the financial institution.

9. The system of claim 8, wherein the instructions further configure the at least one processor to perform operations comprising periodically sending to the blockchain a request for a current amount of private e-currency held by the mobile wallet.

10. The system of claim 9, wherein the instructions further configure the at least one processor to perform operations comprising registering the mobile wallet and a payment recipient system in the network.

11. The system of claim 8, wherein debiting the financial account of the user further includes receiving from the mobile wallet information related to the financial account.

12. The system of claim 11, wherein the information related to the financial account includes one of payment credentials or account number and a personal identification number (PIN).

13. The system of claim 12, wherein the instructions further configure the at least one processor to perform operations comprising receiving from a payment recipient system in the network a request for a current level of assets and a total amount of private equity of the mobile wallet.

14. The system of claim 8, wherein the instructions further configure the at least one processor to perform operations comprising recording a level of assets in the blockchain and a total amount of private e-currency held by the members of the network.

15. A non-transitory machine-readable medium comprising instructions thereon that, when executed by a processor unit, cause the processor unit to execute operations for managing a private e-currency for a mobile wallet operating on a computing device, the operations comprising:
   receiving, from the mobile wallet, a request for depositing an amount of the private e-currency, the private e-currency being a digital currency that is managed using a blockchain, guaranteed by a financial institution to be convertible into a government-backed currency and only available for transactions with members of a network, the financial institution holding government-backed currency assets;
   reserving funds in the government-backed currency in order to guarantee that the private e-currency is convertible in the government-backed currency;

issuing, to the mobile wallet, the amount of the private e-currency and recording the issuing of the amount in a blockchain, wherein recording the amount includes recording the amount and an address associated the private e-currency;

debiting a financial account of a user an amount of government-backed currency corresponding to the amount of private e-currency issued to the mobile wallet;

querying, by the mobile wallet, the blockchain to verify the amount of the private e-currency stored at the mobile wallet matches a record at the blockchain;

determining if a deviation exists between the amount of the private e-currency stored at the mobile wallet and the record at the blockchain; and if the deviation exists, reporting, by the mobile wallet, the deviation to the financial institution.

16. The non-transitory machine-readable medium of claim 15, wherein the operations further comprise periodically sending to the blockchain a request for a current amount of private e-currency held by the mobile wallet.

17. The non-transitory machine-readable medium of claim 16, wherein the operations further comprise registering the mobile wallet and a payment recipient system in the network.

18. The non-transitory machine-readable medium of claim 15, wherein operations further comprise debiting the financial account of the user further includes receiving from the mobile wallet information related to the financial account.

19. The non-transitory machine-readable medium of claim 18, wherein the information related to the financial account includes one of payment credentials or account number and a personal identification number (PIN).

20. The non-transitory machine-readable medium of claim 19, wherein the operations further comprise receiving from a payment recipient system in the network a request for a current level of assets and a total amount of private equity of the mobile wallet.

21. The non-transitory machine-readable medium of claim 15, wherein the operations further comprise recording a level of assets in the blockchain and a total amount of private e-currency held by the members of the network.

\* \* \* \* \*